(12) United States Patent
Yang et al.

(10) Patent No.: US 8,777,548 B2
(45) Date of Patent: Jul. 15, 2014

(54) PICK-AND-PLACE APPARATUS FOR GLASS SUBSTRATE

(75) Inventors: Weibing Yang, Guandong (CN); Chun Hao Wu, Guandong (CN); Kun Hsien Lin, Guandong (CN); Yongqiang Wang, Guandong (CN); Erqing Zhu, Guandong (CN); Xiande Li, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 13/510,907

(22) PCT Filed: Apr. 13, 2012

(86) PCT No.: PCT/CN2012/073998
§ 371 (c)(1),
(2), (4) Date: May 18, 2012

(87) PCT Pub. No.: WO2013/152502
PCT Pub. Date: Oct. 17, 2013

(65) Prior Publication Data
US 2013/0272834 A1 Oct. 17, 2013

(51) Int. Cl.
*B65G 1/133* (2006.01)

(52) U.S. Cl.
USPC .................................. 414/749.6; 414/749.1

(58) Field of Classification Search
USPC ......... 414/749.6, 935–941, 404–405, 416.11, 414/416.03, 416.04, 222.01, 222.04, 749.1
See application file for complete search history.

(56) References Cited

U.S. PATENT DOCUMENTS

| | | | | | |
|---|---|---|---|---|---|
| 4,203,697 | A | * | 5/1980 | Cayton | 414/345 |
| 5,096,354 | A | * | 3/1992 | Wu | 414/265 |
| 5,468,111 | A | * | 11/1995 | Flint et al. | 414/416.08 |
| 5,655,869 | A | * | 8/1997 | Scheler et al. | 414/222.01 |
| 5,967,740 | A | * | 10/1999 | Pflueger et al. | 414/749.6 |
| 6,579,056 | B2 | * | 6/2003 | Sasaki et al. | 414/539 |

* cited by examiner

*Primary Examiner* — Stephen Vu
(74) *Attorney, Agent, or Firm* — Andrew C. Cheng (57) ABSTRACT

A pick-and-place apparatus for handling glass substrate is disclosed and which comprises a chassis and a transportation platform which includes a transferring device disposed on the chassis and includes a first frame and a plurality of transferring rods rotationally disposed across the first frame along a first reference direction. A vertical displacing mechanism is provided for moving the transportation platform to move vertically to a pre-determined height. And a horizontal displacing device is provided for moving the transportation platform to more along the first reference direction such that the transferring device can be moved in and out of the cartridge, wherein the first transferring rods rotationally move the glass substrate into the cartridge or out of the cartridge.

16 Claims, 10 Drawing Sheets

PICK-AND-PLACE APPARATUS FOR GLASS SUBSTRATE

FIELD OF THE INVENTION

The present invention relates to a liquid crystal display, and more particularly, to a pick-and-place apparatus for a glass substrate.

BACKGROUND OF THE INVENTION

In the existing technology of making a liquid crystal display, a glass substrate has to be transferred from a cartridge, on which a plurality of glass substrates are juxtaposed or piled up, to a production line in which a plurality of different processes are performed on the glass substrate so as to complete a panel. During the transportation, the glass substrates stored in the cartridge has to be removed for inspection, and then put it back after the glass substrates are fully checked and inspected. However, the thickness of the glass substrate is merely about 0.4 to 0.7 mm, and it is very brittle and tends to crack. In addition, once the glass substrate is found damaged, the damaged glass substrate has to be removed from the cartridge.

Since the space between every two adjacent compartments for storing the glass substrates is quite small, and there is no pick-and-place apparatus for retrieving a glass substrate, whether it is damaged, from the cartridge, and then place it back after the glass substrate is checked and inspected. Currently, the pick-and-place is performed manually, and it exhausts a great deal of time. In addition, during the handling, the glass substrate tends to be broken if care is not taken by the handler.

Accordingly, there is a need to provide a pick-and-place apparatus so as to efficiently handle the handling of the glass substrate.

SUMMARY OF THE INVENTION

The present invention provides a pick-and-place apparatus so as to resolve a technical issue in manufacturing a liquid crystal display. A glass substrate can be readily and conveniently retrieved from of a cartridge in which the glass substrates are stored for inspection and check, and then place back after the glass substrate is examined.

In order to resolve the prior art issues, a technical solution provided by the present invention includes a pick-and-place apparatus for handling glass substrate and which comprises a chassis, and a transportation platform which includes a transferring device disposed on the chassis. The transferring device includes a first frame and a plurality of transferring rods rotationally disposed across the first frame along a first reference direction. The transportation platform further includes a lifting mechanism for lifting the transferring rods. A vertical displacing mechanism is provided for moving the transportation platform to move vertically to a pre-determined height. An assisting device includes a supporting frame and a plurality of supporting rods arranged across the supporting frame along the first reference direction. The supporting rods are arranged to move in and out of a cartridge from its side along a second reference direction which is perpendicular to the first reference direction, the first frame being supported by the assisting device. A horizontal displacing device is provided for moving the transportation platform to move along the first reference direction such that the transferring device can be moved in and out of the cartridge, wherein the first transferring rods rotationally move the glass substrate into the cartridge or out of the cartridge.

Wherein the first frame is arranged with a first plurality of slots corresponding to each of the transferring rods, the lifting mechanism including a plurality of slides corresponding to each of the transferring rods, each of the slides being defined with a second slot, a linkage interlinking the slides, and a driving device driving the linkage to move the slides to move along the first reference direction, the first transferring rod passing through the first and second slots, and being lifted upward and downward long with the up and down movement of the slides with the help of the first and second slots.

Wherein the assisting device further includes rollers rotationally arranged on ends of each of the transferring rods, the first frame being defined with track for guiding and receiving the rollers, when the rollers are moved into a pre-determined position within the cartridge along the second reference direction, the first frame is moved into the cartridge along the first reference direction such that the rollers move into the track of the first frame.

Wherein the vertical displacing device includes rotationally screws arranged on the chassis, the transportation platform being provided with nuts enveloped onto the screws, and a power device driving the screws to rotate.

In order to resolve the prior art issues, a technical solution provided by the present invention includes a pick-and-place apparatus for handling glass substrate and which comprises a chassis and a transportation platform which includes a transferring device disposed on the chassis and includes a first frame and a plurality of transferring rods rotationally disposed across the first frame along a first reference direction. A vertical displacing mechanism is provided for moving the transportation platform to move vertically to a pre-determined height. And a horizontal displacing device is provided for moving the transportation platform to move along the first reference direction such that the transferring device can be moved in and out of the cartridge, wherein the first transferring rods rotationally move the glass substrate into the cartridge or out of the cartridge.

Wherein the transportation platform further includes a lifting mechanism for lifting the transferring rods;

Wherein the first frame is arranged with a first plurality of slots corresponding to each of the transferring rods, the lifting mechanism including a plurality of slides corresponding to each of the transferring rods, each of the slides being defined with a second slot, a linkage interlinking the slides, and a driving device driving the linkage to move the slides to move along the first reference direction, the first transferring rod passing through the first and second slots, and being lifted upward and downward long with the up and down movement of the slides with the help of the first and second slots.

Wherein the first slot is arranged vertically, and the second slot includes an inclined portion with respect to the vertical direction.

Wherein the horizontal displacing device is rollers or slidable device disposed on a bottom of the chassis.

Wherein the transportation platform further includes a collecting device disposed on the chassis and arranged in adjacent to the transferring device, the collecting device serving as a buffer for the glass substrate moved our of the cartridge or to be moved in the cartridge, the collecting device further includes a second frame with a plurality of second transferring rods rotationally disposed across the second frame along a first reference direction.

Wherein the transportation platform further includes first rollers disposed on the first transferring rods, and second rollers disposed on the second transferring rod, both the first and second rollers being rotated simultaneously with the first and second transferring rods, the first and second rollers served for supporting the glass substrate.

Wherein further comprises an assisting device including a supporting frame and a plurality of supporting rods arranged across the supporting frame along the first reference direction, the supporting rods being arranged to move in and out of a cartridge from its side along a second reference direction which is perpendicular to the first reference direction, the first frame being supported by the assisting device.

Wherein the assisting device further includes rollers rotationally arranged on ends of each of the transferring rods, the first frame being defined with track for guiding and receiving the rollers, when the rollers are moved into a pre-determined position within the cartridge along the second reference direction, the first frame is moved into the cartridge along the first reference direction such that the rollers move into the track of the first frame.

Wherein the assisting device further includes a first driving transaxle coaxially disposed within at least some of the supporting rods which are interengaged with the first driving transaxle so as to rotate the first transferring rods.

Wherein the assisting device further includes a second driving transaxle and a driving device arranged along the first reference direction, the second driving transaxle being provided with a first magnet ring corresponding to each of the first driving transaxles, the first driving transaxle being provided with a second magnetic ring with respect to the second magnetic ring, the second magnetic ring rotationally coupling to the supporting rods and rotated synchronically with respect to the first driving transaxle so as to slide along the second reference direction, the driving device is used to rotate the second driving transaxle so as to rotate the first magnetic ring which in turn couplingly rotate the second magnetic ring and the first transaxle.

Wherein the supporting frame is configured with a first supporting unit having a first inclined surface, a second supporting unit having a second inclined surface matched with the first inclined surface, and a first driving device, the first driving transaxle being supported onto the first supporting unit, and the first driving device is used to drive the first supporting unit and the second supporting unit to move with respect to the first reference direction in a way that with the coupling interaction between the first inclined surface and the second inclined surface, the first supporting unit is moved to rotate the first transaxle along the second reference direction, and thereby interengaging with the first transaxle.

Wherein the second supporting unit further includes a rack interlinked with the second inclined surface, the first driving device is provided with a pinion meshed with the rack, when the first driving device rotates the pinion to move the rack along the first reference direction, a relative movement between the first supporting unit and the second supporting unit is completed.

Wherein the supporting frame is configured with a third supporting unit having a third inclined surface, a fourth supporting unit having a fourth inclined surface matched with the second inclined surface, and a first driving device, the supporting rods, the first supporting unit, and the second supporting unit are fixedly arranged onto the third supporting unit, the second driving device is used to drive the third and fourth supporting units to move relatively along the second reference direction in a way that the coupled third and fourth inclined surfaces will drive the third supporting unit to move along the second reference direction such that the supporting rods, the first and second supporting units driven accordingly to make the supporting rods to move in-and-out of the cartridge.

Wherein the vertical displacing device includes screws rotationally arranged onto the chassis, and nuts enveloped onto the screws and fixedly arranged onto the transportation platform.

Wherein the vertical displacing device is further includes a driving device to synchronically rotate the screws.

The advantages gained by implementation of the present invention can be concluded as follow. The pick-and-place apparatus can be used to retrieve the glass substrate out from the cartridge, and also put the glass substrate back to the cartridge. The pick-and-place device can be readily and ideally for automation as all the procedures can be performed efficiently and in a in-time manner. Most of all, not glass substrate will be damaged.

BRIEF DESCRIPTION OF PREFERRED EMBODIMENT

DETAILED DESCRIPTION OF PREFERRED EMBODIMENT

A detailed description and explanation of a preferred embodiment made accordance with the present invention will be given herebelow along with the accompanied drawings.

Figure 1:
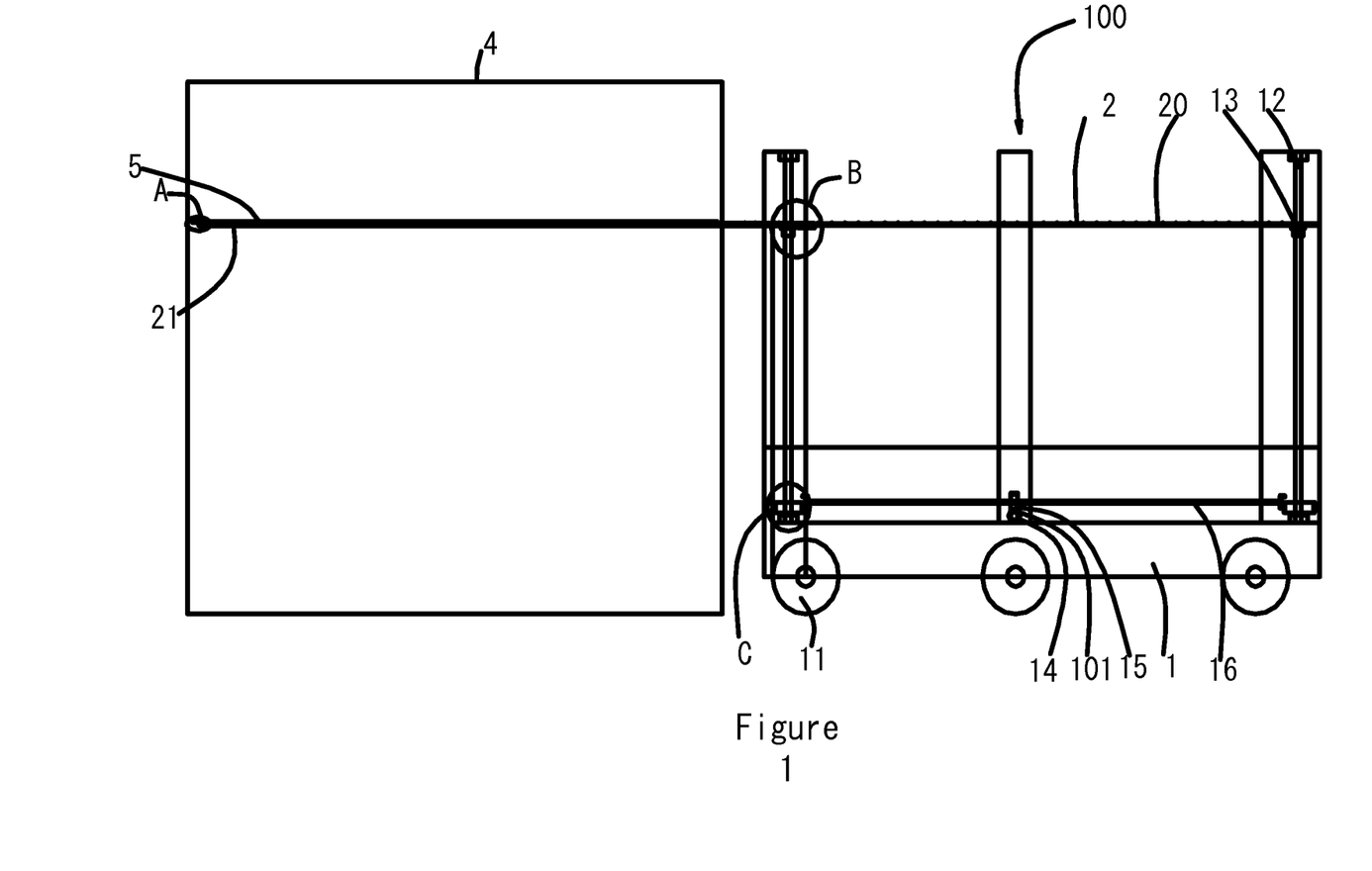
FIG. 1 is an illustrational view in which a pick-and-place apparatus made in accordance with the present invention moves into a cartridge and lift up a glass substrate.
Figure 2:
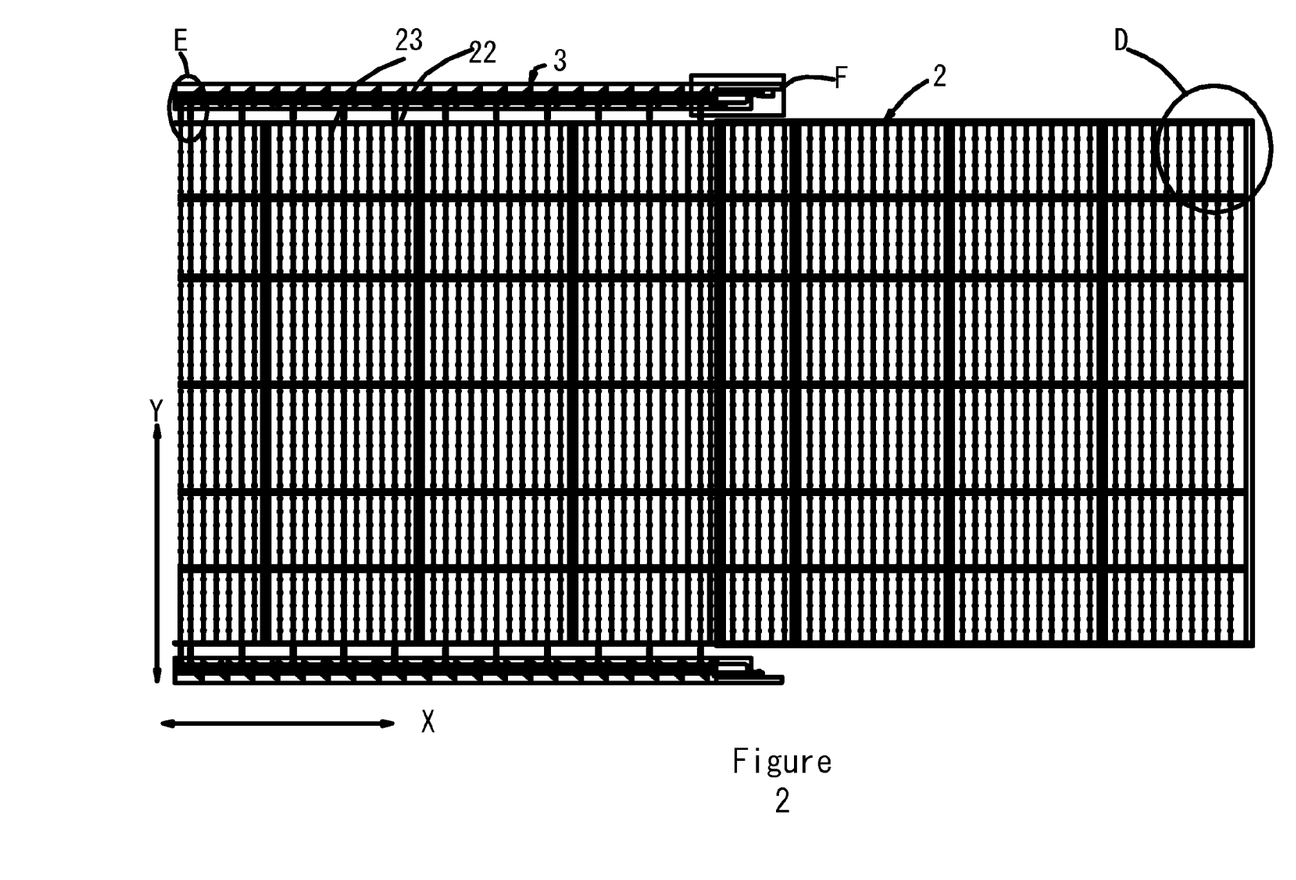
FIG. 2 is a top view of a transportation platform and an assisting device of the pick-and-place apparatus made in accordance with the present invention.

Referring to FIGS. 1 and 2, a pick-and-place apparatus 100 made in accordance with a preferred embodiment of the present invention generally comprises a chassis 1 and a transportation platform 2. The transportation platform 1 is disposed on the chassis 1 and includes a transferring device 21 which can move in and out of a cartridge 4, and a collecting device 20 arranged adjacent to the transferring device 21.

The pick-and-place apparatus 100 further includes a horizontal displacing device 11 and a vertical displacing device. The horizontal displacing device 11 is used to move the transportation platform 2 along the first reference direction X so as to move the transferring device 21 in-and-out of the cartridge 4. The vertical displacing device is used to move the transportation platform 2 along the vertical direction in a way that the transportation platform 2 can be lifted upward to a desired position or height.

In this preferred embodiment, the horizontal displacing device 11 is rollers which are disposed on a bottom of the chassis 1. In the actual application, the horizontal displacing device 11 can be other slidable device. By the provision of the horizontal displacing device 11, the pick-and-place apparatus 100 can be moved along the first reference direction X. For example, by pushing/pulling the chassis 1 and with the help of the horizontal displacing device 11, the transferring device 21 of the transportation platform 2, which has been placed to a desired height, can be moved in-and-out of the cartridge 4 so as to retrieve or place back a glass substrate 5. The transferring device 21 includes a plurality of transferring rods 23 rotationally arranged to retrieve the glass substrate 5 from the cartridge 4, or place the glass substrate 5 back into the cartridge 4.

Figure 5:
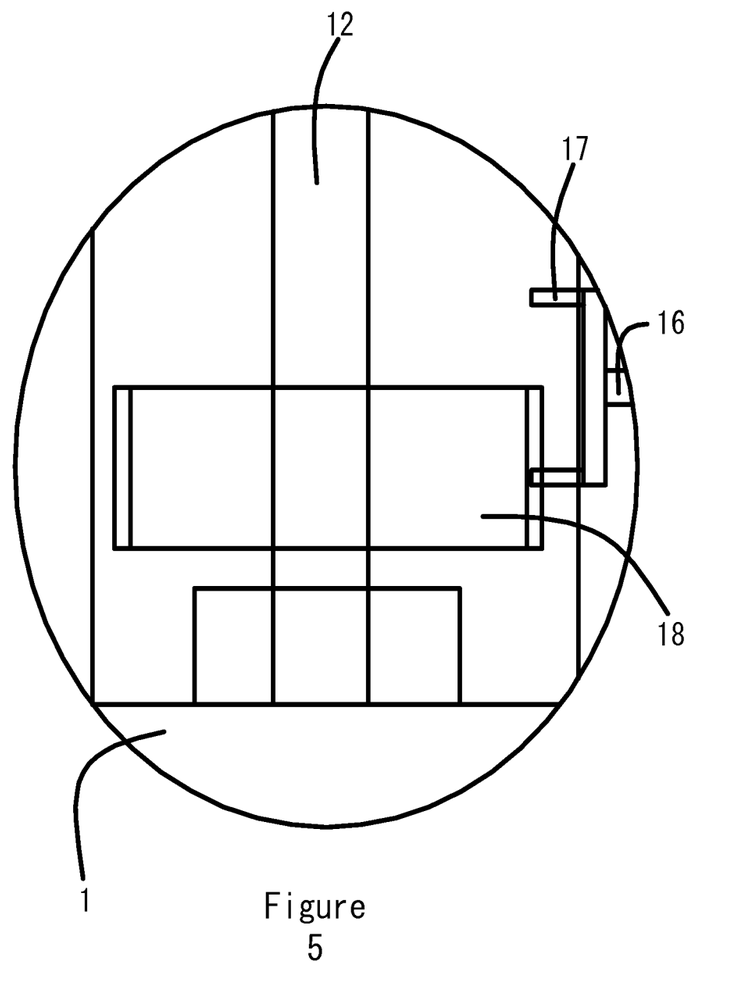
FIG. 5 is an enlarged view encircled C of FIG. 1.

Referring to FIG. 5, the vertical displacing device includes a pair of screws 12 which are vertically arranged on the chassis 1, and a pair of nuts 13 which are enveloped onto the screws 12 so as to move up and down when the screws 12 are rotated and the nuts 13 are stayed. The vertical displacing device further includes a first driving device 101 which is synchronically rotated along with the screws 12. The driving device 101 is configured with a worm rod 14 which provides rotational power, and a worm gear 15 meshed with the worm rod 14, a transaxle 16 coaxially secured to the worm gear 15, and a first gear 17 disposed on a first end of the transaxle 16, and a second gear 18 securely and coaxially secured to the screws 12. The nuts 13 are fixedly and securely arranged on the transportation platform 2.

When the worm rod 14 is rotated, the worm gear 15 is driven to rotate accordingly along with the transaxle 16 which is coaxially interlinked to the worm gear 15. In a chain reaction, the first and second gears 17 and 18 are also rotated such that the screws 12 are rotated synchronically. As a result, the transportation platform 2 can be moved up and down with the counterclockwise and clockwise rotation of the screws 12, and the height or position of the transportation platform 2 is therefore adjusted accordingly.

Figure 3:
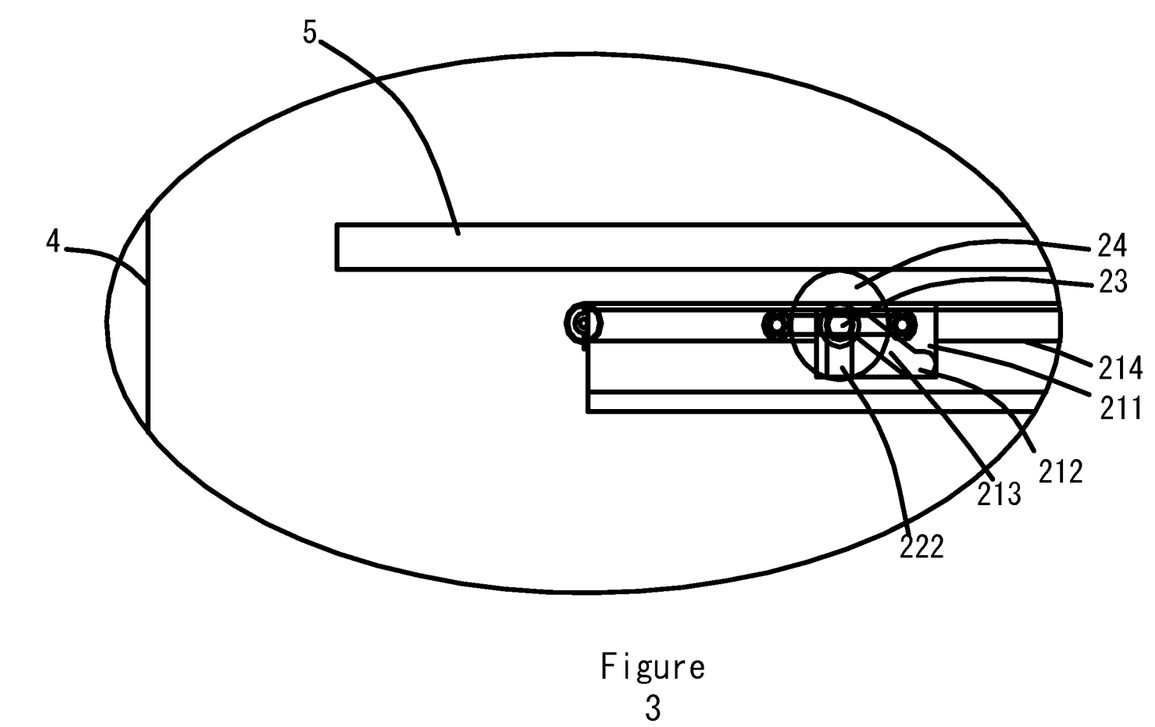
FIG. 3 is an enlarged view of bracketed area A of FIG. 1.
Figure 4:
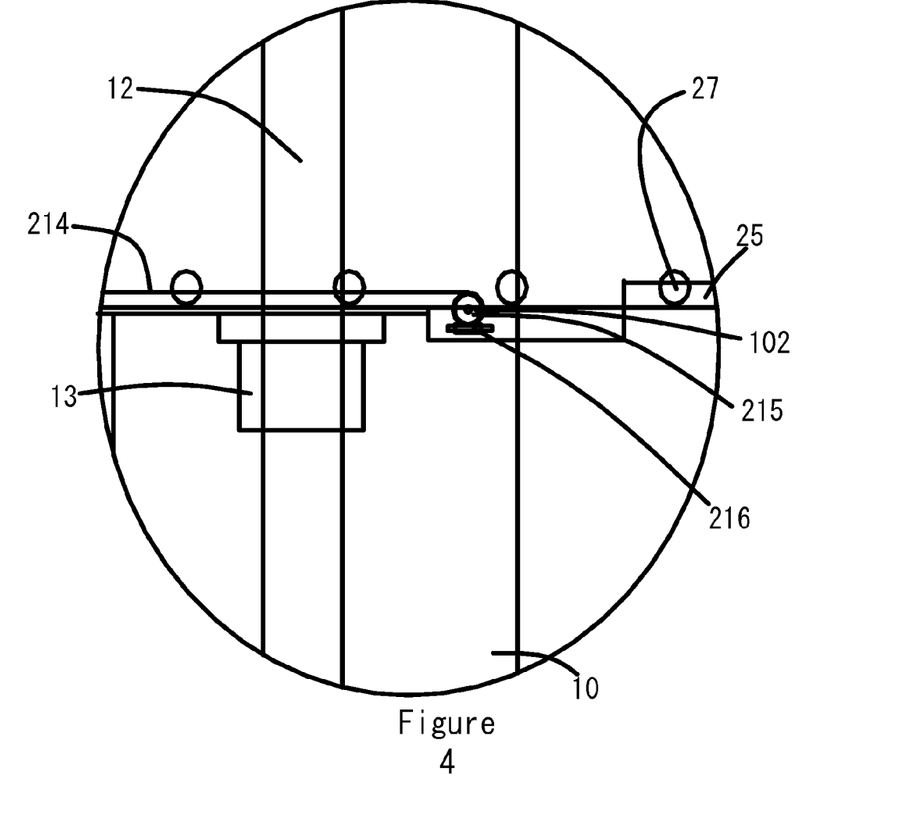
FIG. 4 is an enlarged view encircled B of FIG. 1.

Because the space between two adjacent glass substrate 5 stored within the cartridge 4 is very small, in order to prevent other glass substrates 5, which are located adjacent to those damaged glass substrate to be removed, from being damaged or scratched by the transferring device 21 of the transportation platform 2 during the moving in-and-out, the transportation platform 2 further includes a lifting device for lifting the first transferring rods 23. Referring to FIGS. 3 and 4 for details.

The first frame 22 is provided and defined with a plurality of first slots 222 corresponding to each of the transferring rods 23. The lifting device includes a slide 211 having a second slot 212 in responding to each of the first transferring rods 23. The lifting device further includes a interlink 214 interconnecting with each of the slides 211, and a second driving device 102 moving the interlink 214 to move the slides 211 to move along the first reference direction X. The second driving device 102 includes a worm rod 216 for providing rotational drive, and a worm gear 216, and a worm gear 215 meshed with the worm rod 216. The interlink 214 is interengaged to the worm gear 215. The second slot 212 includes an inclined portion 213. The first slot 222 is arranged vertically, and the inclined portion 213 of the second slot 212 is arranged with respect to a vertical direction. Each of the first transferring rods 23 passes through the first and second slots 222 and 212. With the limitation of the first slot 222, the transferring rods 23 is limited from moving along the first reference direction X. On the other hand, during the horizontal movement of the slides 211, with the help of the inclined portion 213 of the second slot 212, the first transferring rods 23 can be moved vertically within the first slot 222.

When the transferring device 21 of the transportation platform 2 is moved in-and-out of the cartridge 4, the first transferring rods 23 are located at a bottom position of the first and second slots 222 and 212. The transferring device 21 has a slim thickness thereby effectively preventing the transferring device 21 from damaging adjacent glass substrate 5 within the cartridge 4.

When the transportation platform 2 is located in the cartridge 4 and is going to jack up the substrate 5 so as to retrieve the same, the worm rod 216 of the second driving device 102 is then rotated such that the worm gear 215 which is interlinked with the worm rod 216 is also rotated. In chain reaction, the slides 211 are also moved by the interlink 214 driven by the worm gear 215. Meanwhile, the first transferring rods 23, which is located within the first and second slots 222 and 212, is lifted along the inclined portion 213 of the second slot 212 as the transferring rods 23 are limited by both the first and second slots 222 and 212. Accordingly, the glass substrate 5 is lifted.

In order to make sure that the transferring rods 23 to keep leveled during the lifting movement, the first frame 22 is provided with a pair of lifting device located on each sides of the first frame 22. In actual implementation, this should not impose a constraint to this implementation.

Figure 6:
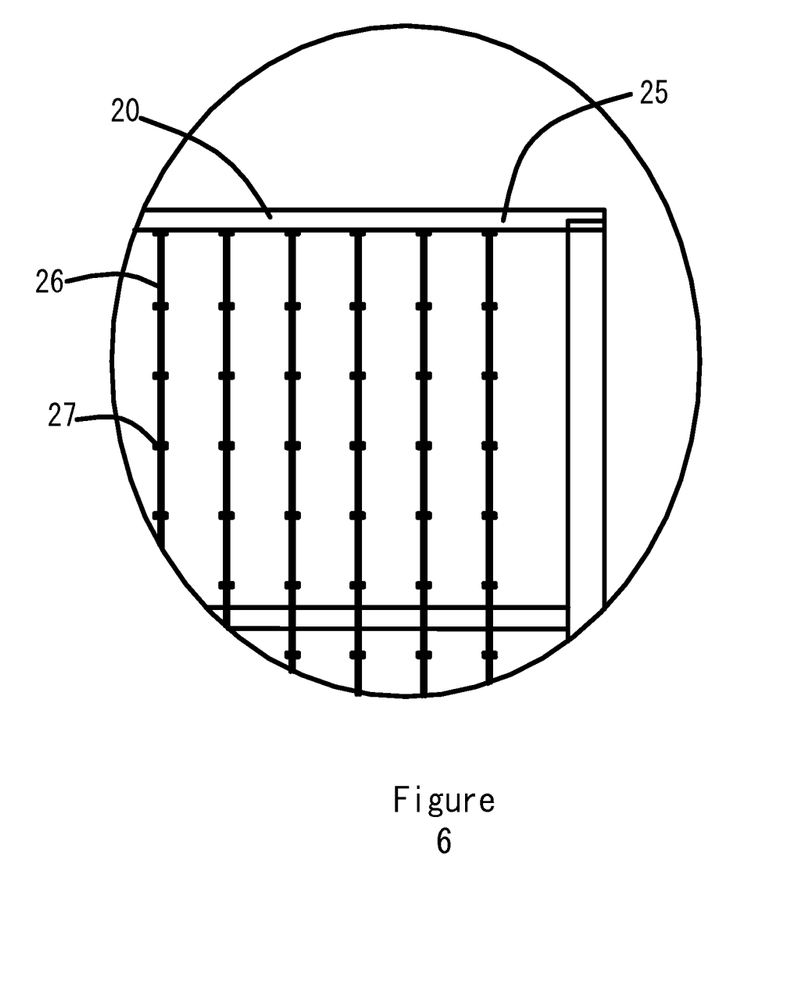
FIG. 6 is an enlarged view encircled D of FIG. 2.
Figure 7:
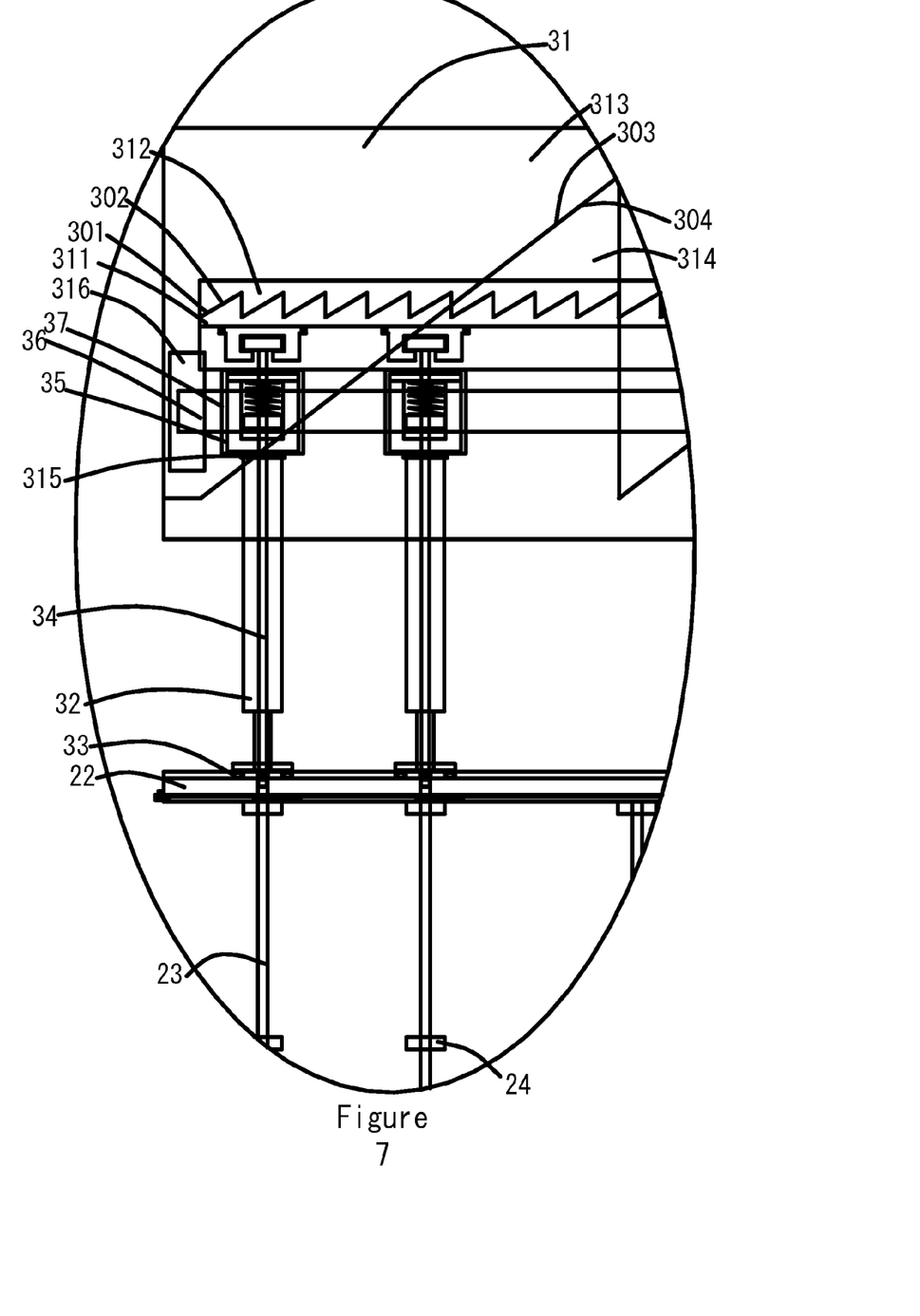
FIG. 7 is an enlarged view encircled E of FIG. 2.

Referring to FIG. 6, the collecting device 20 of the transportation platform 2 is used as a as a buffer for the glass substrate 5 moved our of the cartridge 4 or to be moved in the cartridge 4. The collecting device 20 further includes a second frame 20 with a plurality of second transferring rods 26 rotationally disposed across the second frame 25 along a first reference direction.

Since the collecting device 20 will not be moved in-and-out of the cartridge 4, accordingly, there is no need to provide a lifting device for the second transferring rods 26. As a result, during the moving in-and-out of the transferring device 21 with respect to the cartridge 4, the initial level or height of the first transferring rods 23 is lower than the level or height of the second transferring rods 26.

There is no limitation to the specs of the first frame 20 and the second frame 25. For example, the second frame 25 can be wider than the first frame 20, or equal to it. The thickness of the second frame 25 is larger than the thickness of the first frame 22.

As shown in FIGS. 3 and 6, the transportation platform 2 further includes first rollers 24 fixedly disposed on the first transferring rods 23, and second rollers 27 fixedly disposed on the second transferring rods 26. The first rollers 24 are rotated synchronically with the first transferring rods 23. The second rollers 27 are rotated synchronically with the second transferring rods 26. Both the first and second rollers 24 and 27 are used to support the glass substrate 5. By the provision of the first and second rollers 24 and 27, the surface contact between the glass substrate 5 and the first and second transferring rods 23 and 26 of the transferring device 21 and the collecting device 20 is largely reduced. As a result, the damaging to the glass substrate 5 when it is moved in and out from the cartridge 4 is lowered.

The thickness of the transferring device 21 of the transportation platform 2 is constraint to the space between two adjacent glass substrates 5. Accordingly, it generally has a thinner thickness. However, the transferring device 21 has a larger dimension along the first reference direction X. As a result, when the transferring device 21 is carrying a large-scale glass substrate 5, the glass substrate 5 tends to warp resulted from its own weight. This may impose damage to the glass substrate during the transferring. In order to avoid this unwanted issue, the pick-and-place apparatus 100 further includes an assisting device 3 used to support the first frame 22 of the transferring device 21. The substantial and detailed configuration of the assisting device 3 along with the transportation platform 2 will be detailedly described and explained along with accompanied drawings, FIGS. 7 to 10.

The assisting device 3 includes a pair of supporting frame 31 and a plurality of supporting rods 31 arranged across the supporting frames 31 along the first reference direction X. The assisting device 3 further includes rollers 33 rotationally arranged on ends of each of the supporting rods 32. Some of the supporting rods 32 are provided with a first driving transaxle 34, and a second driving transaxle 36 arranged along the first reference direction X. The assisting device 3 further includes a plurality of first magnetic ring 37 enveloped onto the second driving transaxle 36 with respect to the first driving transaxle 34, and a plurality of second magnetic ring 35 enveloped onto the first driving transaxle 34 and with respect to the second driving transaxle 36. The assisting device 3 further includes bearings 316 for rotationally supporting the second driving transaxle 36, and bearings 315 used to rotationally interconnect to the supporting rods 32 and the second magnetic ring 35, and a driving device 38.

The supporting frame 31 is configured with a first supporting unit 311, a second supporting unit 312, and a first linear bearing (not shown), a third driving device 103, a third supporting unit 313, a fourth supporting unit 314, a second linear bearing (not shown), and a fourth driving device 104.

The first supporting unit 311 is provided with a first inclined surface 301 on which the first driving transaxle 34 is rotationally supported thereon. The second supporting unit 312 is provided with a second inclined surface 302 matched with the first inclined surface 301. The second supporting unit 312 further includes a rack 305 interlinked to the second inclined surface 302. The third driving device 103 includes a pinion 306 meshed with the rack 305 to drive it to move along a linear movement. The first inclined surface 301 of the first supporting unit 311 and the second inclined surface 302 of the second supporting unit 312 are matched together and are interconnected with a first linear axis. By rotating the pinion 306 of the third driving device 103, the second supporting unit 312 can be moved with respect to the first supporting unit 311 along the first reference direction X. As a result, with the function and relative movement of the first and second inclined surfaces 301 and 302, the first supporting unit 311 is displaced along the second reference direction Y, and the first driving transaxle 34 is rotated accordingly.

The third supporting unit 313 is defined with a third inclined surface 303, and the fourth supporting unit 314 is provided with a fourth inclined surface 304 which is meshed with the third inclined surface 303. The supporting rods 32, the first supporting unit 311, and the second supporting unit 312 are fixedly arranged onto the third supporting unit 313. The third inclined surface 303 of the third supporting unit 313 and the fourth inclined surface 304 of the fourth supporting unit 314 are matched together and are interconnected with a first linear axis. The fourth driving device 104 includes a nut 308 fixedly arranged onto the fourth supporting unit 314, and a worm rod 307 which is fixedly arranged with respect to the fourth supporting unit 314, and provides rotational power to the nut 308. By rotating the worm rod 37 of the fourth driving device 104, the fourth supporting unit 314 can be moved along the first reference direction X with respect to the third supporting unit 313, the supporting rods 32, the first and second supporting units 311 and 312. In turn, the dual action between the third inclined surface 303 of the third supporting unit 313 and the fourth inclined surface 304 of the fourth supporting unit 314, the third supporting unit 313 is moved to displace along the second reference direction Y. In turn, the supporting rods 32, the first supporting unit 311, the second supporting unit 312 are moved accordingly. As a result, the rollers 33 disposed on the supporting rods 32 can move in-and-out of the cartridge 4 along the second reference direction.

Figure 8:
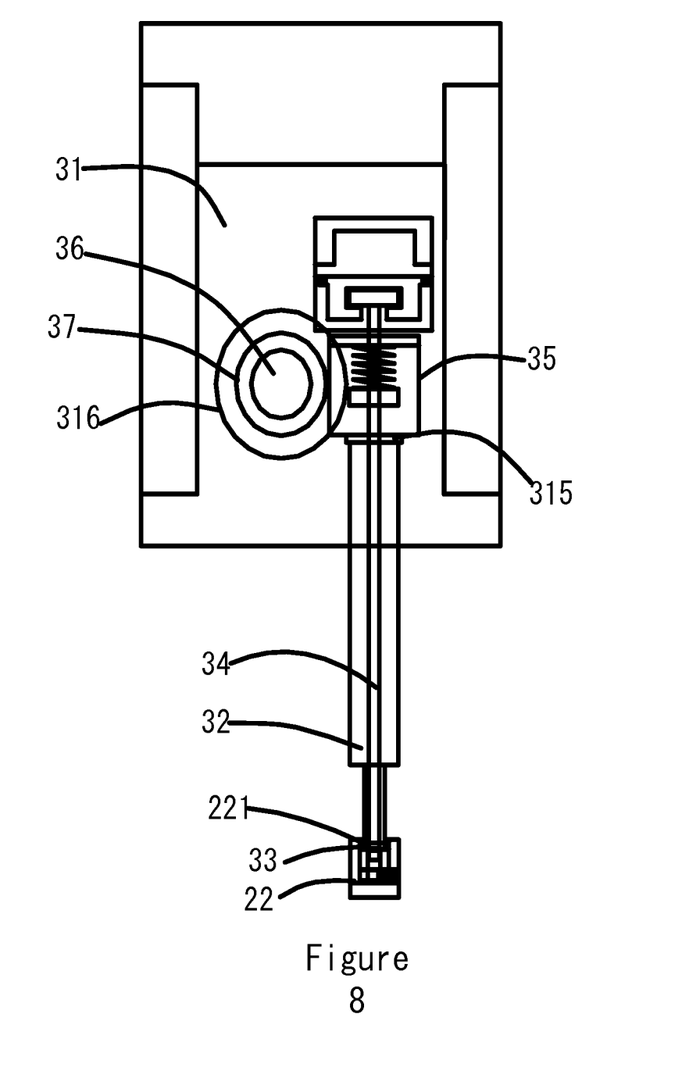
FIG. 8 is an illustrational view showing an interconnection between the assisting device and a first frame.
Figure 9:
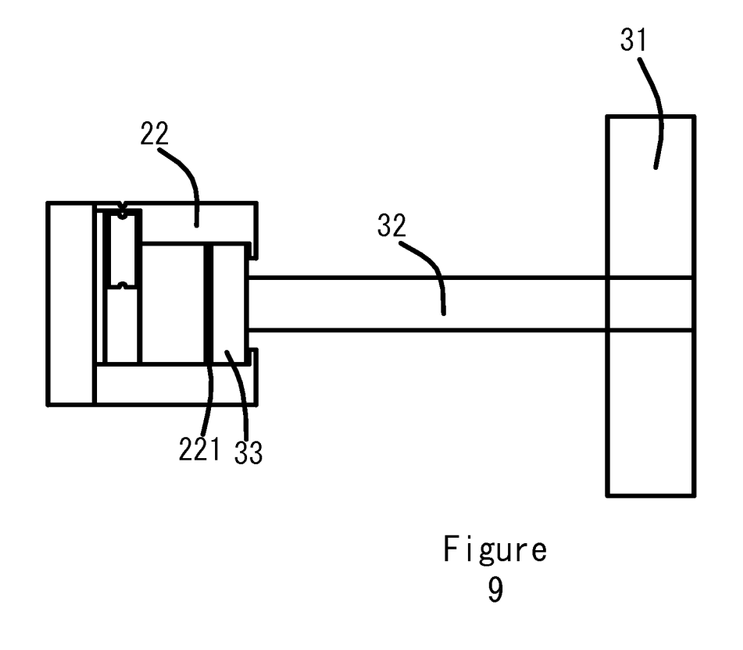
FIG. 9 is similar to FIG. 8, while viewed from another angle.
Figure 10:
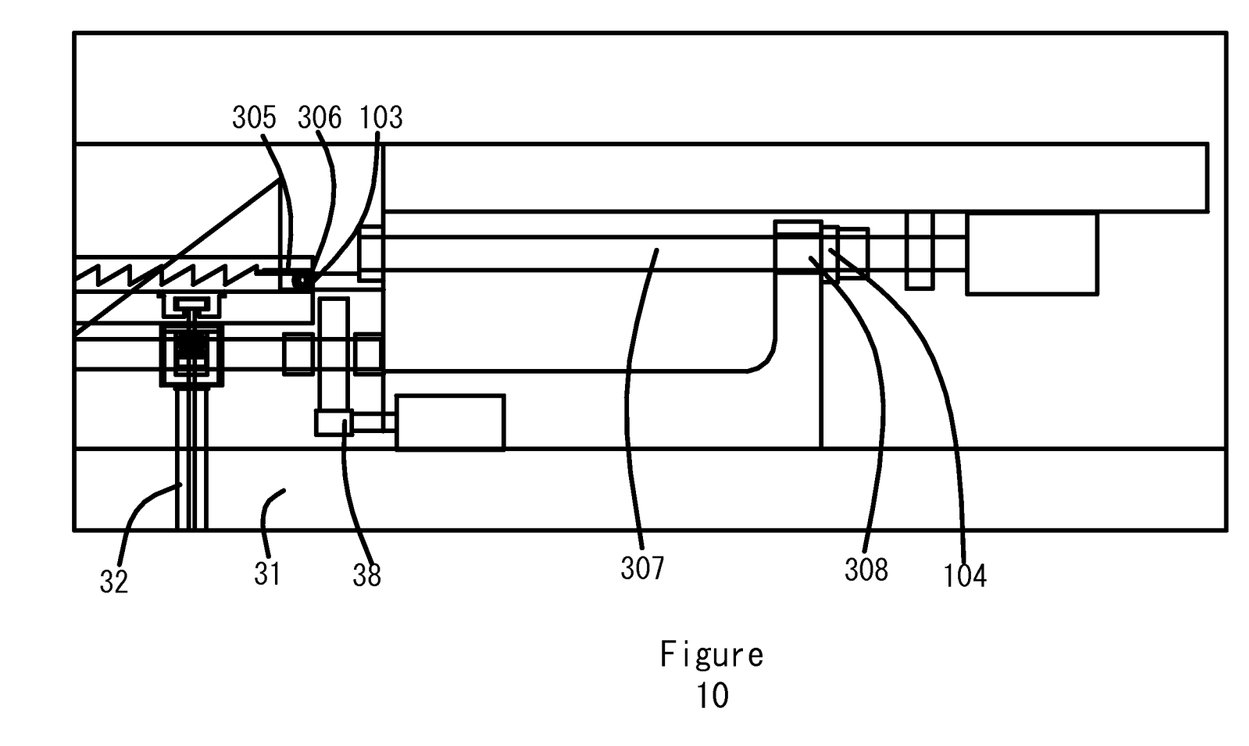
FIG. 10 is an enlarged view encircled F of FIG. 2.

The first frame 22 is defined with track 221 for receiving the rollers 33 therein. When the rollers 33 are driven along the second reference direction Y by the fourth driving device 104 into the pre-determined position of entering the cartridge 4, the first frame 22 will enter the cartridge 4 along the first reference direction X. The track 221 will move into the track 221, i.e. the track 221 of the first frame 22 will run along the roller 33. Accordingly, the transferring device 31 of the transportation platform 2 will be supported by the assisting device 3.

The first driving transaxles 34 are coaxially extending through some of the supporting rods 32 and are rotationally supported on the first supporting unit 311. As such, the first driving transaxle can rotate centered on its own axis. The first driving transaxle 34 is corresponding to the first transferring rod 23 of the transferring device 21, and by the driving of the third driving device 103, the first transferring rods 23 can be driven. Substantially, when the third driving device 103 is driven, the first supporting unit 311 is moved to displace along the second reference direction Y. In turn, the it drives the first driving transaxle 34 to move along the second reference direction Y with respect to the second supporting unit 312, the third supporting unit 313, the fourth supporting unit 314, the supporting rods 32, and the second magnetic ring 35. Accordingly, interconnection with respect to the first transferring rods 23 is completed.

The second driving transaxle 36 is rotationally arranged onto the third supporting unit 313 along the first reference direction X by means of the bearing 316. The first magnetic ring 37 is disposed onto the second driving transaxle 36 in a position corresponding to the first driving transaxle 34. The first magnetic ring 37 rotates synchronically with the second driving transaxle 36. The second magnetic ring 35 is enveloped onto the first driving transaxle 36 in a position corresponding to the second driving transaxle 36. The first magnetic ring 37 is perpendicular to the second magnetic ring 35. The second magnetic ring 35 is rotationally interconnected to the supporting rod 32 by means of bearing 315 and rotated synchronically with the first driving transaxle 34. The second magnetic ring 35 can displace along the second reference direction Y with respect to the first driving transaxle 34. A driving device 38 is used to rotate the second driving transaxle 36 to rotate the first magnetic ring 37. As a result, by the coupling between the first and second magnetic rings 37 and 35, the first driving transaxle 34 is rotated as the second magnetic ring 35 rotates.

The operational procedures of the pick-and-place apparatus 100 to retrieve the glass substrate 5 within the cartridge 4 will be described as below.

Manipulating the first driving device 101 such that the transportation platform 2 is adjusted, lifting up or lower down, to a desired position, which is slight lower than a glass substrate 5 to be retrieved. By this arrangement, the transferring device 31 will not get in touch with the glass substrate 5 to be retrieved, and the glass substrate 5 which is adjacent to the glass substrate 5 to be retrieved.

Manipulating the fourth driving device 104 such that the rollers 33 of the supporting rods 32 move into a preset position of the cartridge 4 along the second reference direction Y.

Maneuvering the chassis 1 such that the pick-and-place apparatus 100 is driven to displace horizontally by the help of the horizontal displacing device 11. In turn, the track 221 of the first frame 22 of the transferring device 21 slides with the guidance of the rollers 33. Eventually, the transferring device 21 moves into the cartridge 4 and is supported by the rollers 33.

Manipulating the second driving device 102 in a way that the first transferring rods 23 are moved upward along the first and second slots 222 and 223. As a result, the surface in which the transferring rods 23 are located is lifted, and the glass substrate 5 to be retrieved is lifted.

Manipulating the third driving device 103 in a way that the first supporting unit 311 moves the first driving transaxle 34 to engage with the first transferring rod 23 along the second reference direction Y.

Manipulating the driving device 38 in a way that the with the coupling between the first and second magnetic rings 37 and 35, the first driving transaxle 34 is rotated by the second driving transaxle 36. Eventually, the glass substrate 5 is retrieved from the cartridge 4 and then further moved to the collecting device 20 of the transportation platform 2. The retrieving of the glass substrate 5 from the cartridge 4 is completed.

After the glass substrate 5 is successfully retrieved the removal procedures of the pick-and-place apparatus 100 are as follow. Firstly, stop the power of the driving device 38. Secondly, reverse the first driving device 103 such that the first transferring rod 23 is disengaged with the first driving transaxle 34. Thirdly, reverse the second driving device 102 such that the first transferring rod 23 returns to its initial position. Fourthly, manipulating the horizontal displacing device 11 to remove the transferring device 21 out of the cartridge 4. Lastly, and fifthly, reversing the second driving device 104 to remove the rollers 33 out of the cartridge 4.

On the other hand, with the use of the pick-and-place apparatus 100, the glass substrate 5 can be placed into the cartridge 4. The steps or procedures of placing the glass substrate 5 back to the cartridge 4 is very similar to retrieve the glass substrate 5 from the cartridge 4. Specially, steps a) through e) are also applicable to place the glass substrate 5 back to the cartridge 4. Only in the last step, since the retrieving and placing back are opposite to each other, as a result, the operation direction of the driving device 38 is reversed. In the present invention, the second transferring rod 26 of the collecting device 20 is without external power, accordingly, after the glass substrate 5 is disposed on the collecting device 20, it is necessary to push the glass substrate 5 in a way such that a portion of the glass substrate 5 moves into the transferring device 3 till the glass substrate 5 can be pulled by the transferring device 3.

In actual application, as for readily returning the glass substrate 5 back to the cartridge 4, the second transferring rod 26 are preferably incorporated with a power device, for example, extending the working length of the supporting frame 31 of the assisting device 3, the second transaxle 36, and/or increasing the number of additional first driving transaxle 34, the first magnetic ring 35, and the second magnetic ring 37. By this arrangement, the transferring device 21 and the collecting device 20 may share the driving device 38.

The advantages gained by implementation of the present invention can be concluded as follow. The pick-and-place apparatus can be used to retrieve the glass substrate out from the cartridge, and also put the glass substrate back to the cartridge. The pick-and-place device can be readily and ideally for automation as all the procedures can be performed efficiently and in an in-time manner. Most of all, not glass substrate will be damaged.

The above described is merely preferred embodiment of the present invention, and it is merely for illustration while not for limitation. As a result, any alternation and modification or any equivalents based on the specification as well as the drawings will be covered by the attached claims even they are applied to other fields of technology directly or indirectly.

The invention claimed is:

1. A pick-and-place apparatus for handling glass substrate, comprising:
a chassis;
a transportation platform including a transferring device disposed on the chassis, and including a first frame and a plurality of transferring rods rotationally disposed across the first frame along a first reference direction, the transportation platform further including a lifting mechanism for lifting the transferring rods;
a vertical displacing mechanism for moving the transportation platform to move vertically to a pre-determined height;
an assisting device including a supporting frame and a plurality of supporting rods arranged across the supporting frame along the first reference direction, the supporting rods being arranged to move in and out of a cartridge from its side along a second reference direction which is perpendicular to the first reference direction, the first frame being supported by the assisting device;
a horizontal displacing device for moving the transportation platform to move along the first reference direction such that the transferring device can be moved in and out of the cartridge, wherein the first transferring rods rotationally move the glass substrate into the cartridge or out of the cartridge; and
wherein the first frame is arranged with a first plurality of slots corresponding to each of the transferring rods, the lifting mechanism including a plurality of slides corresponding to each of the transferring rods, each of the slides being defined with a second slot, a linkage interlinking the slides, and a driving device driving the linkage to move the slides to move along the first reference direction, the first transferring rod passing through the first and second slots, and being lifted upward and downward long with the up and down movement of the slides with the help of the first and second slots.

2. The pick-and-place apparatus as recited in claim 1, wherein the assisting device further includes rollers rotationally arranged on ends of each of the transferring rods, the first frame being defined with track for guiding and receiving the rollers, when the rollers are moved into a pre-determined position within the cartridge along the second reference direction, the first frame is moved into the cartridge along the first reference direction such that the rollers move into the track of the first frame.

3. The pick-and-place apparatus as recited in claim 1, wherein the vertical displacing device includes rotationally screws arranged on the chassis, the transportation platform being provided with nuts enveloped onto the screws, and a power device driving the screws to rotate.

4. A pick-and-place apparatus for handling glass substrate, comprising:
a chassis;
a transportation platform including a transferring device disposed on the chassis, and including a first flame and a plurality of transferring rods rotationally disposed across the first flame along a first reference direction;
a vertical displacing mechanism for moving the transportation platform to move vertically to a pre-determined height;
a horizontal displacing device for moving the transportation platform to move along the first reference direction such that the transferring device can be moved in and out of the cartridge, wherein the first transferring rods rotationally move the glass substrate into the cartridge or out of the cartridge;

wherein the transportation platform further includes a lifting mechanism for lifting the transferring rods;

wherein the first frame is arranged with a first plurality of slots corresponding to each of the transferring rods, the lifting mechanism including a plurality of slides corresponding to each of the transferring rods, each of the slides being defined with a second slot, a linkage interlinking the slides, and a driving device driving the linkage to move the slides to move along the first reference direction, the first transferring rod passing through the first and second slots, and being lifted upward and downward long with the up and down movement of the slides with the help of the first and second slots; and wherein the transportation platform further includes a collecting device disposed on the chassis and arranged in adjacent to the transferring device, the collecting device serving as a buffer for the glass substrate to be moved out of the cartridge or to be moved in the cartridge, the collecting device further includes a second frame with a plurality of second transferring rods rotationally disposed across the second frame along a first reference direction.

5. The pick-and-place apparatus as recited in claim 4, wherein the first slot is arranged vertically, and the second slot includes an inclined portion with respect to the vertical direction.

6. The pick-and-place apparatus as recited in claim 4, wherein the horizontal displacing device is rollers or slidable device disposed on a bottom of the chassis.

7. The pick-and-place apparatus as recited in claim 4, wherein the transportation platform further includes first rollers disposed on the first transferring rods, and second rollers disposed on the second transferring rod, both the first and second rollers being rotated simultaneously with the first and second transferring rods, the first and second rollers served for supporting the glass substrate.

8. The pick-and-place apparatus as recited in claim 4, further comprising an assisting device including a supporting frame and a plurality of supporting rods arranged across the supporting frame along the first reference direction, the supporting rods being arranged to move in and out of a cartridge from its side along a second reference direction which is perpendicular to the first reference direction, the first frame being supported by the assisting device.

9. The pick-and-place apparatus as recited in claim 8, wherein the assisting device further includes rollers rotationally arranged on ends of each of the transferring rods, the first frame being defined with track for guiding and receiving the rollers, when the rollers are moved into a pre-determined position within the cartridge along the second reference direction, the first frame is moved into the cartridge along the first reference direction such that the rollers move into the track of the first frame.

10. The pick-and-place apparatus as recited in claim 8, wherein the assisting device further includes a first driving transaxle coaxially disposed within at least some of the supporting rods which are interengaged with the first driving transaxle so as to rotate the first transferring rods.

11. The pick-and-place apparatus as recited in claim 10, wherein the assisting device further includes a second driving transaxle and a driving device arranged along the first reference direction, the second driving transaxle being provided with a first magnet ring corresponding to each of the first driving transaxles, the first driving transaxle being provided with a second magnetic ring with respect to the second magnetic ring, the second magnetic ring rotationally coupling to the supporting rods and rotated synchronically with respect to the first driving transaxle so as to slide along the second reference direction, the driving device is used to rotate the second driving transaxle so as to rotate the first magnetic ring which in turn couplingly rotate the second magnetic ring and the first transaxle.

12. The pick-and-place apparatus as recited in claim 10, wherein the supporting frame is configured with a first supporting unit having a first inclined surface, a second supporting unit having a second inclined surface matched with the first inclined surface, and a first driving device, the first driving transaxle being supported onto the first supporting unit, and the first driving device is used to drive the first supporting unit and the second supporting unit to move with respect to the first reference direction in a way that with the coupling interaction between the first inclined surface and the second inclined surface, the first supporting unit is moved to rotate the first transaxle along the second reference direction, and thereby interengaging with the first transaxle.

13. The pick-and-place apparatus as recited in claim 12, wherein the second supporting unit further includes a rack interlinked with the second inclined surface, the first driving device is provided with a pinion meshed with the rack, when the first driving device rotates the pinion to move the rack along the first reference direction, a relative movement between the first supporting unit and the second supporting unit is completed.

14. The pick-and-place apparatus as recited in claim 12, wherein the supporting frame is configured with a third supporting unit having a third inclined surface, a fourth supporting unit having a fourth inclined surface matched with the second inclined surface, and a first driving device, the supporting rods, the first supporting unit, and the second supporting unit are fixedly arranged onto the third supporting unit, the second driving device is used to drive the third and fourth supporting units to move relatively along the second reference direction in a way that the coupled third and fourth inclined surfaces will drive the third supporting unit to move along the second reference direction such that the supporting rods, the first and second supporting units driven accordingly to make the supporting rods to move in-and-out of the cartridge.

15. The pick-and-place apparatus as recited in claim 4, wherein the vertical displacing device includes screws rotationally arranged onto the chassis, and nuts enveloped onto the screws and fixedly arranged onto the transportation platform.

16. The pick-and-place apparatus as recited in claim 15, wherein the vertical displacing device is further includes a driving device to synchronically rotate the screws.

* * * * *